United States Patent
Nicholas et al.

(10) Patent No.: US 9,618,048 B2
(45) Date of Patent: Apr. 11, 2017

(54) REVERSE BYPASS COOLING FOR TILTED PAD JOURNAL AND TILTING PAD THRUST BEARINGS

(71) Applicant: Lufkin Industries, LLC, Lufkin, TX (US)

(72) Inventors: John C. Nicholas, Wellsville, NY (US); Thomas P. Shoup, Wellsville, NY (US); Adam Fiegl, Wellsville, NY (US); Don H. Rockefeller, Little Genesee, NY (US); Josh Ronan, Lufkin, TX (US)

(73) Assignee: Lufkin Industries, LLC, Lufkin, TX (US)

( * ) Notice: Subject to any disclaimer, the term of this patent is extended or adjusted under 35 U.S.C. 154(b) by 97 days.

(21) Appl. No.: 14/457,445

(22) Filed: Aug. 12, 2014

(65) Prior Publication Data
US 2016/0047421 A1    Feb. 18, 2016

(51) Int. Cl.
*F16C 37/00* (2006.01)
*F16C 33/10* (2006.01)
*F16C 17/06* (2006.01)
*F16C 17/03* (2006.01)
*F16C 17/24* (2006.01)
*F16C 32/06* (2006.01)

(52) U.S. Cl.
CPC ............. *F16C 37/00* (2013.01); *F16C 17/03* (2013.01); *F16C 17/06* (2013.01); *F16C 17/243* (2013.01); *F16C 33/108* (2013.01); *F16C 37/002* (2013.01); *F16C 32/0666* (2013.01)

(58) Field of Classification Search
CPC ........ F16C 17/243; F16C 17/03; F16C 17/06; F16C 32/0666; F16C 33/108; F16C 37/002; F16C 33/1025; F16C 33/1035; F16C 33/1065; F16C 33/1085; F16C 2300/30; Y10S 384/90
USPC ........ 384/117, 122, 248, 291, 306, 312–313, 384/316, 321, 368, 900; 165/104.31
See application file for complete search history.

(56) References Cited

U.S. PATENT DOCUMENTS

| | | | |
|---|---|---|---|
| 2,348,928 | A | 5/1944 | Sampatacos |
| 2,507,021 | A | 5/1950 | Lakey |
| 2,950,002 | A | 8/1960 | Eastburg |
| 3,021,182 | A | 2/1962 | Schnacke |

(Continued)

FOREIGN PATENT DOCUMENTS

| | | |
|---|---|---|
| EP | 1334282 | 8/2003 |
| EP | 1334282 A2 | 8/2003 |

(Continued)

OTHER PUBLICATIONS

Nicholas, J., "Bearing Solutions for High-Speed Gearbox Applications", Gear Solutions, Jul. 2011.

(Continued)

*Primary Examiner* — Marcus Charles
(74) *Attorney, Agent, or Firm* — Crowe & Dunlevy, P.C.

(57) ABSTRACT

A bypass cooling system and method for tilting pad journal and titling pad thrust bearings wherein the cooling may be achieved by spraying the cool inlet oil downhill with gravity instead of always in the direction of the shaft rotation. A bypass cooling system always sprays the cool inlet oil downhill, with gravity instead of always in the direction of shaft rotation.

17 Claims, 7 Drawing Sheets

(56) References Cited

U.S. PATENT DOCUMENTS

| | | | |
|---|---|---|---|
| 3,378,319 A | 4/1968 | Cutting et al. | |
| 3,454,312 A | 7/1969 | Bielec | |
| 3,502,375 A | 3/1970 | Whittum | |
| 3,687,510 A | 8/1972 | Cooper | |
| 3,893,737 A | 7/1975 | Tyson | |
| 3,982,796 A | 9/1976 | Hill | |
| 4,247,157 A | 1/1981 | Sigg | |
| 4,291,926 A | 9/1981 | Tomioka et al. | |
| 4,302,060 A | 11/1981 | Nicholas et al. | |
| 4,335,925 A | 6/1982 | Stopp | |
| 4,456,391 A | 6/1984 | New | |
| 4,497,587 A | 2/1985 | Pine | |
| 4,501,505 A * | 2/1985 | Chambers | F16C 17/06 384/152 |
| 4,566,204 A | 1/1986 | Friesner | |
| 4,568,204 A | 2/1986 | Chambers | |
| 4,699,524 A | 10/1987 | Bath | |
| 5,211,484 A | 5/1993 | Quaglia | |
| 5,288,153 A | 2/1994 | Gardner | |
| 5,423,613 A | 6/1995 | Keck et al. | |
| 5,482,380 A * | 1/1996 | Corratti | F16C 17/03 384/309 |
| 5,513,917 A | 5/1996 | Ide et al. | |
| 5,515,458 A | 5/1996 | Ide et al. | |
| 5,518,321 A | 5/1996 | Hata | |
| 5,547,287 A | 8/1996 | Zeidan | |
| 5,660,481 A | 8/1997 | Ide et al. | |
| 5,702,186 A | 12/1997 | Hackstie et al. | |
| 5,738,356 A * | 4/1998 | Marshall | F01D 25/186 277/313 |
| 5,738,447 A | 4/1998 | Nicholas | |
| 5,743,654 A | 4/1998 | Ide et al. | |
| 5,879,085 A | 3/1999 | Ball et al. | |
| 5,915,843 A | 6/1999 | Mattera | |
| 5,951,172 A | 9/1999 | Byrne | |
| 6,361,215 B1 * | 3/2002 | Wilkes | F16C 17/03 384/117 |
| 6,485,182 B2 | 11/2002 | Nicholas | |
| 6,588,933 B2 * | 7/2003 | Ferguson | F16C 17/04 384/122 |
| 8,366,323 B2 * | 2/2013 | Waki | F16C 17/03 384/117 |
| 2009/0080820 A1 * | 3/2009 | Matyscak | F16C 33/108 384/293 |
| 2014/0161381 A1 | 6/2014 | Buchanan et al. | |
| 2014/0270607 A1 | 9/2014 | Livermore-Hardy et al. | |

FOREIGN PATENT DOCUMENTS

| | | |
|---|---|---|
| GB | 671769 | 5/1952 |
| JP | 56-76724 | 6/1981 |

OTHER PUBLICATIONS

International Search Report and written opinion issued in connection with corresponding Application No. PCT/US2015/044699 on Dec. 10, 2015.

Mehta, N.P. et al., "Stability of Finite Elliptical Pressure Dam Bearings with Rotor Flexibility Effects", ASLE Transactions, vol. 29, No. 4, pp. 548-557, Apr. 1981.

Nicholas, J.C. et al., "Analysis of Step Journal Bearings—Finite Length, Stability", ASLE Transactions, vol. 22, No. 2, pp. 197-207, Apr. 1980.

Nicholas, J.C., "Stability, Load Capacity, Stiffness, and Damping Advantages of the Double Pocket Journal Bearing", ASME Journal of Tribology, Jan. 1985.

Nicholas, J.C. et al., "Theory and Application of Multipocket Bearings for Optimum Turborotor Stability", ASLE Transactions, vol. 24, No. 2, pp. 269-275, Apr. 1981.

Timken, "AP Bearings for Industrial Applications", Timken catalog, copyright 2008 by Timken, [retrieved from the Internet on Oct. 22, 2014 using <URL: http://www.timken.com/EN-US/products/Documents/Timken-AP-Bearing-Catalog.pdf>].

Vesselinov, V., International Search Report for International Application No. PCT/US2015/044699, European Patent Office, dated Dec. 10, 2015.

Vesselinov, V., Written Opinion for International Application No. PCT/US2015/044699, European Patent Office, dated Dec. 10, 2015.

* cited by examiner

REVERSE BYPASS COOLING FOR TILTED PAD JOURNAL AND TILTING PAD THRUST BEARINGS

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The inventions disclosed and taught herein relate generally to bypass cooling assemblies, and more specifically are related to reverse bypass cooling assemblies adapted to carry heat away from bearing assemblies during bearing operation.

Description of the Related Art

Segmented bearing assemblies are known and includes a plurality of arcuate pads, each tilting through a small angle so as to create a thin wedge shape opening between a shaft and an inner surface of the pad. The opening allows developing a film of oil which supports the load. However, because the film of oil interface is sheared as the oil is dragged through the bearing interface, the oil temperature rises. If the oil temperature rises sufficiently, its viscosity falls, and if the temperature rises substantially, its viscosity falls to a point where there is a direct rubbing of the metal shaft on the metal bearing surfaces, resulting in greater friction which may increase the bearing temperature to destructive level.

U.S. Pat. No. 5,738,447 to Nicholas, which belongs to the same assignee as the present application and is fully incorporated herein by reference, discloses a pad bearing assembly and more specifically, to a pad bearing assembly which uses spray and blocker bars to more effectively and efficiently remove heated lubricating fluid and introduce cooler lubricating fluid into the bearing assembly. In addition, cool lubricating oil is injected directly onto the leading edge of the next pad and in the direction of the shaft rotation.

U.S. Pat. No. 6,485,182 to Nicholas, which belongs to the same assignee as the present application and is fully incorporated herein by reference, describes a non-flooded bearing assembly for supporting a rotating body and selected from tilting pad journal, tilting pad thrust and sleeve bearings, has a body made from AMPCOLOY™ and provided with babbitted bearing and outer surfaces. The bearing assembly has a combination of passages extending between the outer and bearing surfaces for delivering a pressurized liquid lubricant to the bearing surface. A plurality of heat transfer chambers are provided in the body separately from and at a distance from the bearing surface to convey the pressurized liquid lubricant carrying the heat generated by the bearing surface away from the assembly.

U.S. Pat. No. 5,738,447 and U.S. Pat. No. 6,485,182, cool inlet oil is introduced behind the tilting pads by the blocker bars and/or housing inlet holes. The cooling oil takes heat away from the pads and directs it into the drain thereby cooling the pads and allowing the bearing to operate at higher speeds and higher loads. This is called bypass cooling. In U.S. Pat. No. 5,738,447 and U.S. Pat. No. 6,485,182, the bypass cooling oil is sprayed in the direction of shaft rotation.

The inventions disclosed and taught herein are directed to a bypass cooling for tilting pad journal and titling pad thrust bearings wherein the cooling may be achieved by spraying the cool inlet oil downhill with gravity instead of always in the direction of the shaft rotation.

BRIEF SUMMARY OF THE INVENTION

The objects described above and other advantages and features of the invention are incorporated in the application as set forth herein, and the associated appendices and drawings, related to bypass cooling systems and methods in a bearing assembly for spraying the cool inlet oil downhill with gravity instead of only in the direction of the shaft rotation.

In accordance with a first embodiment of the present disclosure, a bearing assembly for supporting a rotatable member is disclosed. The bearing assembly typically includes a bearing casing having an inner surface and a plurality of pads mounted to the inner surface of the bearing casing, the pads having bearing surfaces, which support the rotatable member, outer surfaces spaced from the bearing surfaces, and a leading edge and a trailing edge with respect to the rotatable member. The bearing assembly may include a blocker bar mounted to an upper half of the inner surface of the bearing casing and positioned between two of the plurality of the pads, a left pad and a right pad. The blocker bar may have two sets of liquid coolant conduits, the first set of liquid coolant conduits positioned to deliver liquid coolant toward the left pad and is positioned to deliver liquid coolant in the direction of gravity, and the second set of liquid coolant conduits positioned to deliver liquid coolant toward a right pad and is positioned to deliver liquid coolant in the direction of gravity. The bearing assembly may be a tilting pad journal bearing or a tilting pad thrust bearing.

The bearing assembly may further comprise circumferential axial passages positioned between the inner surface of the bearing casing and the outer surfaces of the plurality of pads, wherein the liquid coolant delivered by the liquid coolant conduits may traverse. The bearing assembly may further comprise circumferential axial passages with open grooves provided on the outer surface of the plurality of pads. The bearing assembly may further comprise cooling holes positioned as a hole drilled through the left pad and a hole through the drilled right pad, wherein the liquid coolant delivered by the liquid coolant conduits may traverse. A first set of liquid coolant conduits of a bearing assembly may be positioned to deliver liquid coolant to allow standard bypass cooling and a second set of liquid coolant conduits may be positioned to delivered liquid coolant to allow reverse bypass cooling. A first set of liquid coolant conduits of a bearing assembly may be positioned to deliver liquid coolant to allow reverse bypass cooling and a second set of liquid coolant conduits may be of a bearing assembly positioned to delivered liquid coolant to allow standard bypass cooling.

In accordance with another embodiment of the present disclosure, a method for carrying the heat away from a bearing assembly is disclosed. The bearing assembly typically includes a generally cylindrical body and a plurality of pads, which supports the rotating member, and a circumferential bearing casing spaced from the bearing surface, having an inner surface. The bearing assembly may be a tilting pad journal bearing or a tilting pad thrust bearing. The bearing assembly may further comprise circumferential axial passages with open grooves provided on the outer surface of the plurality of pads.

The method for carrying the heat away from a bearing assembly may include the step of providing a blocker bar mounted to an upper half of the inner surface of the bearing casing, and positioned between two of the plurality of the pads, a left pad and a right pad. The method may further include the step of providing a plurality of axial passages extending in a space between an inner surface of the circumferential bearing casing and each of the plurality of pads. The method may further include the step of delivering a liquid coolant to the axial passages of the left pad and the right pad, wherein the liquid coolant is delivered in two substantially opposite directions and generally in the direction with gravity. The method may further include the step of providing liquid coolant cooling holes positioned as a hole drilled through the left pad and a hole through the drilled right pad. The delivering of the liquid coolant to the axial passages of the upper left pad may be designed to allow standard bypass cooling and the delivering of the liquid coolant to the axial passages of the upper left pad is accomplished to allow reverse bypass cooling. The delivering of the liquid coolant to the axial passages of the upper left pad may be designed to allow reverse bypass cooling and the delivering of the liquid coolant to the axial passages of the upper left pad is accomplished to allow standard bypass cooling.

In accordance with a first embodiment of the present disclosure, a bearing assembly for supporting a rotatable member is disclosed. The bearing assembly typically includes a bearing casing having an inner surface and a plurality of pads mounted to the inner surface of the bearing casing, the pads having bearing surfaces, which support the rotatable member, wherein there is a left pad and a right pad, outer surfaces spaced from the bearing surfaces, and a leading edge and a trailing edge with respect to the rotatable member. The bearing assembly may include a plurality of axial passages extending in a plane between the inner surface of the bearing casing and each of the plurality of pads. The axial passages may be grooves provided on the outer surface of the plurality of pads. The bearing assembly may include at least two sets of liquid coolant conduits connected to an upper half of the inner surface of the bearing casing, wherein the first set of liquid coolant conduits are positioned to deliver liquid coolant toward the axial passages between the bearing surface and the left pad and is positioned to deliver liquid coolant in the general direction of gravity, and wherein the second set of liquid coolant conduits are positioned to deliver liquid coolant toward the axial passages between the surface of the bearing casing and the right pad and is positioned to deliver liquid coolant generally in the general direction of gravity. The bearing assembly may be a tilting pad journal bearing or a tilting pad thrust bearing.

The bearing assembly may further comprise cooling holes positioned as a hole drilled through the left pad and a hole drilled through the right pad, wherein the liquid coolant delivered by the liquid coolant conduits may traverse. The first set of liquid coolant conduits of the bearing assembly may be positioned to allow standard bypass cooling and the second set of liquid coolant conduits may be positioned to allow reverse bypass cooling. The first set of liquid coolant conduits of the bearing assembly may be positioned to allow reverse bypass cooling and the second set of liquid coolant conduits of the bearing assembly may be positioned to allow standard bypass cooling. The plurality of pads of the bearing assembly may be tiltably mounted on the inner surface of the bearing casing to accommodate horizontal and vertical shift of the rotatable member.

As used herein, the term "oil" is as generic to any liquid lubricant that can be used to cool and lubricate the bearings encompassed by the present inventions.

As used herein, the term "standard bypass" cooling refers to cooling oil delivered in the direction of rotation.

As used herein, the term "reverse bypass" cooling refers to cooling oil delivered against rotation.

BRIEF DESCRIPTION OF THE SEVERAL VIEWS OF THE DRAWINGS

The following figures form part of the present specification and are included to further demonstrate certain aspects of the present invention. The invention may be better understood by reference to one or more of these figures in combination with the detailed description of specific embodiments presented herein.

Figure 1A:
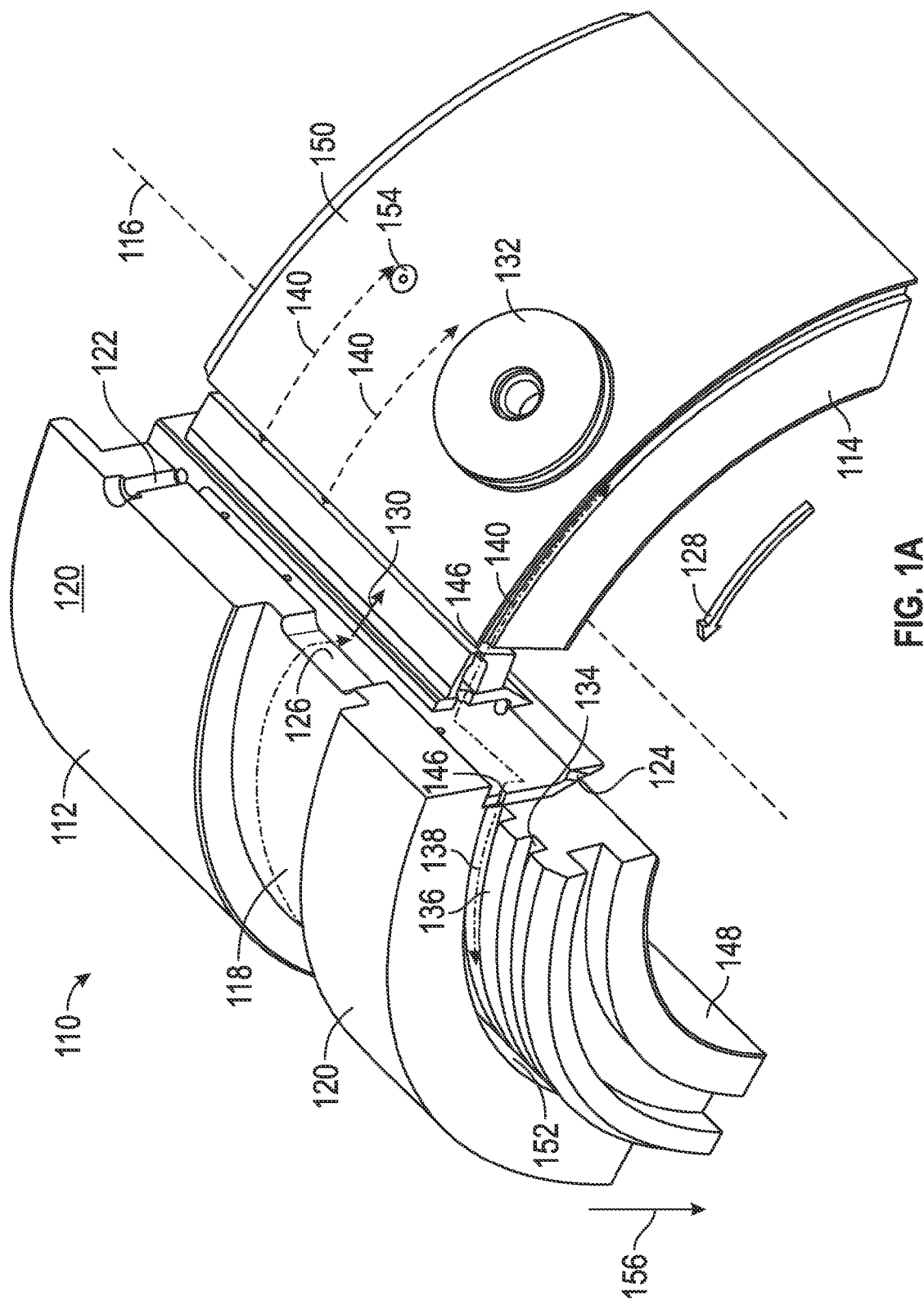
FIG. 1A illustrates a perspective view of one of many possible embodiments of bypass cooling system provided in a journal bearing assembly.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Applicants have created a bypass cooling system and method for tilting pad journal and titling pad thrust bearings wherein the cooling may be achieved by spraying the cool inlet oil downhill with gravity instead of always in the direction of the shaft rotation. A bypass cooling system directs the cool inlet oil downhill, with gravity instead of always in the direction of shaft rotation. It was believed that the windage from the rotating shaft would pull the bypass cooling oil around the pads in the direction of shaft rotation. However, regardless of rotational windage, it has been found that when the cooling oil needs to traverse uphill against gravity, it is not as effective as cooling oil that traverses downhill, with gravity. Cooling oil may be any liquid coolant.

Turning now to the figures, FIGS. 1A, 1B, 1C, 2A, 2B, 2C, 3A, 3B, and 3C show a bypass cooling system as shown in conjunction with a tilting pad journal bearing 110, which could be a gearbox pinion tilting pad journal bearing. The bypass cooling system allows cool inlet oil to flow on and through the tilting pads 114 without interfering with a lubricating process of the babbitted inner surfaces of tilting pads 114, which support a shaft (not shown) extending along an axis 116. In this particular embodiment, the direction of shaft rotation 128 is counterclockwise, but the direction of shaft rotation 128 could also be clockwise. In this particular embodiment, tilting pad journal bearing 110 is shown with a gear load 142 that is directed upwards and at a slight angle with shaft rotation. The upper tilting pads 114 are the loaded pads while the lower tilting pads 114 are the unloaded pads. As will be shown in more detail below, only the loaded pads receive bypass cooling oil. Particularly, the tilting pad bearing 110 has a shell or casing 112 and a pair of side plates (not shown) which are attached to the casing by a plurality of fastening elements (now shown). The casing is provided with a central circumferential channel 118 defined between two raised annular ribs 120, provided with a plurality of fastening elements 122, which attach blocker bars 124 to the casing 112.

The blocker bars 124, which also may function as spray bars, extend radially and between the trailing and leading edges of the adjacent tilting pads 114 and, in combination with the bypass cooling assembly, direct the heat, which is generated within the non-flooded housing, away from the tilting pads 114, as explained herein below. The upper blocker bar 124 at the top of the tilting pad journal bearing 110 may deliver both the standard bypass oil downhill 138 in the direction of shaft rotation 128 to the upper left tilting pad 114 and the reverse bypass oil downhill 140 against the direction of shaft rotation 128 to the upper right tilting pad 114. This upper blocker bar 124 arrangement is designed to always direct the cool inlet oil downhill, with gravity 156 instead of always in the direction of shaft rotation 128.

Figure 1B:
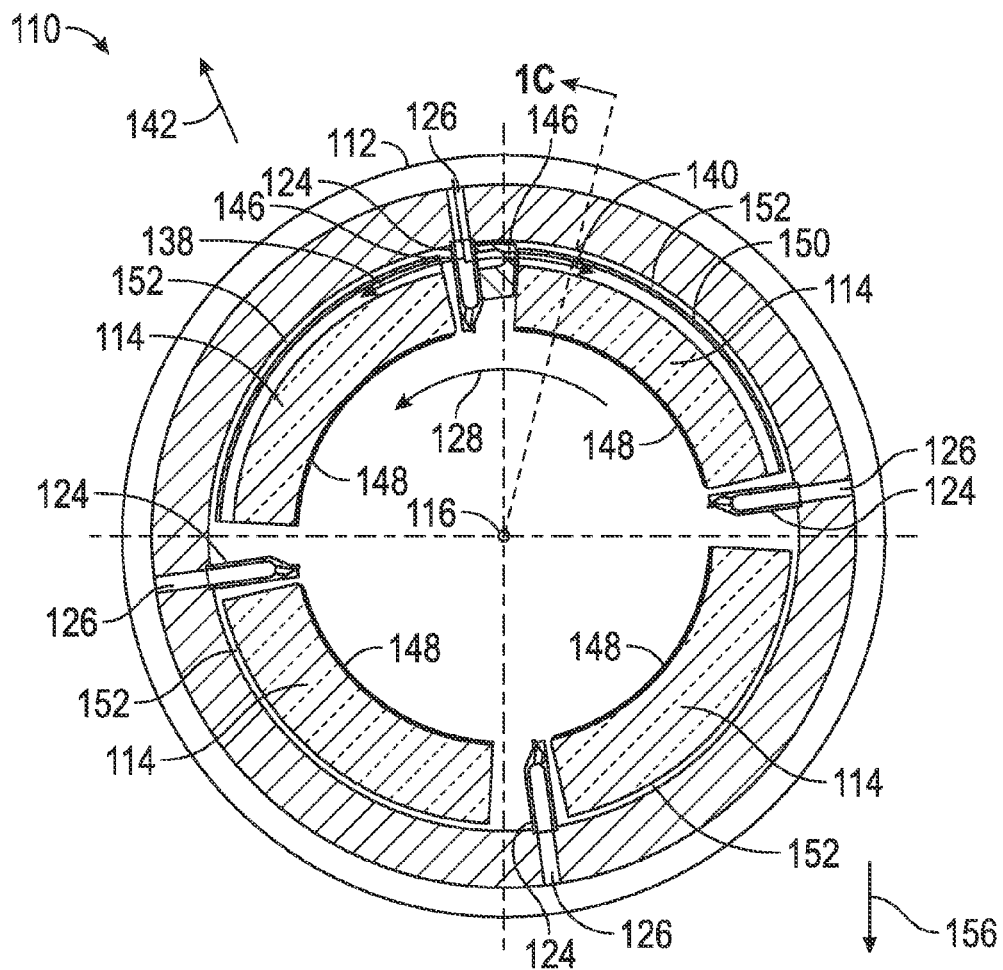
FIG. 1B illustrates a sectional view of the embodiment illustrated in FIG. 1A.
Figure 1C:
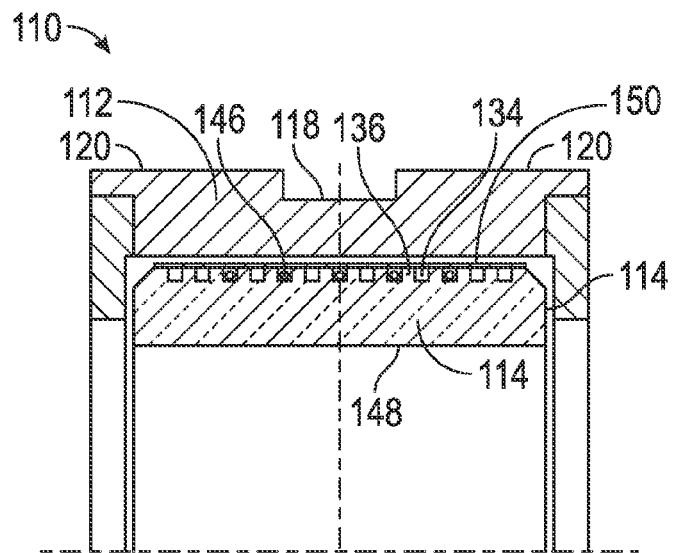
FIG. 1C illustrates a sectional view of the embodiment illustrated in FIG. 1A.

The bypass cooling assembly includes a combination of a plurality of upstream cooling oil inlets 126 provided in the shell 112, wherein at least one of the inlets 126 may be located in the central channel 118, whereas the rest of inlets can be provided in recessed regions of the two raised annular ribs 120 typically axially aligned with bolts (not shown) which hold a pivot 132, such as a spherical bolt or any other pivotal element, into the shell 112. As shown in FIGS. 1A, 1B, and 1C, the inlets 126 can extend in a plane substantially perpendicular to a tangent 130 to the circumference of the tilting pad 114; however, it is conceivable to manufacture these inlets 126 so that they extend at other angles with respect to the tangent.

Cool inlet oil, which is supplied under a substantial pressure through the inlets 126, is further driven along a plurality of circumferential heat-transfer chambers 134 machined on the outer surface of the tilting pads 114. A cooling groove containment plate or cover 150 may optionally be located on the outer surface of the loaded tilting pads 114. A cooling groove containment plate or cover 150 may assist in containing the bypass cooling oil, making the system more efficient. The cooling groove containment plate or cover 150 may be attached to the tilting pad 114 by fastening elements 154. As the cool inlet oil advances through the heat-transfer chambers 134, it picks up the heat conducted away from the babbitted surface by the tilting pads 114.

Cooling oil may be introduced under pressure in oil conduits 146 of the blocker bar 124 extending radially inwardly from the central channel 118 and guiding the cooling oil into an axial passage 152. The axial passage 152 distributes the cooling oil toward the leading and trailing edges of the upper tilting pads 114. Within the axial passage 152, there may be heat-transfer chambers 134 defined between heat-transfer chamber ribs 136 circumferentially running behind the tilting pads 114 of the tilting pad journal bearing 110. In this particular embodiment, the upper left tilting pad 114 receives standard bypass oil downhill 138 with rotation while the upper right pad 114 receives reverse bypass oil downhill 140 against rotation. For both pads, the bypass oil may be delivered into heat transfer chambers 134 on the back of the tilting pads 114. The oil may be delivered from oil conduits 146. The oil conduits 146 may be located in the blocker bar 124, the casing 112, or otherwise positioned on or in the tilting pad journal bearing 110.

Figure 2A:
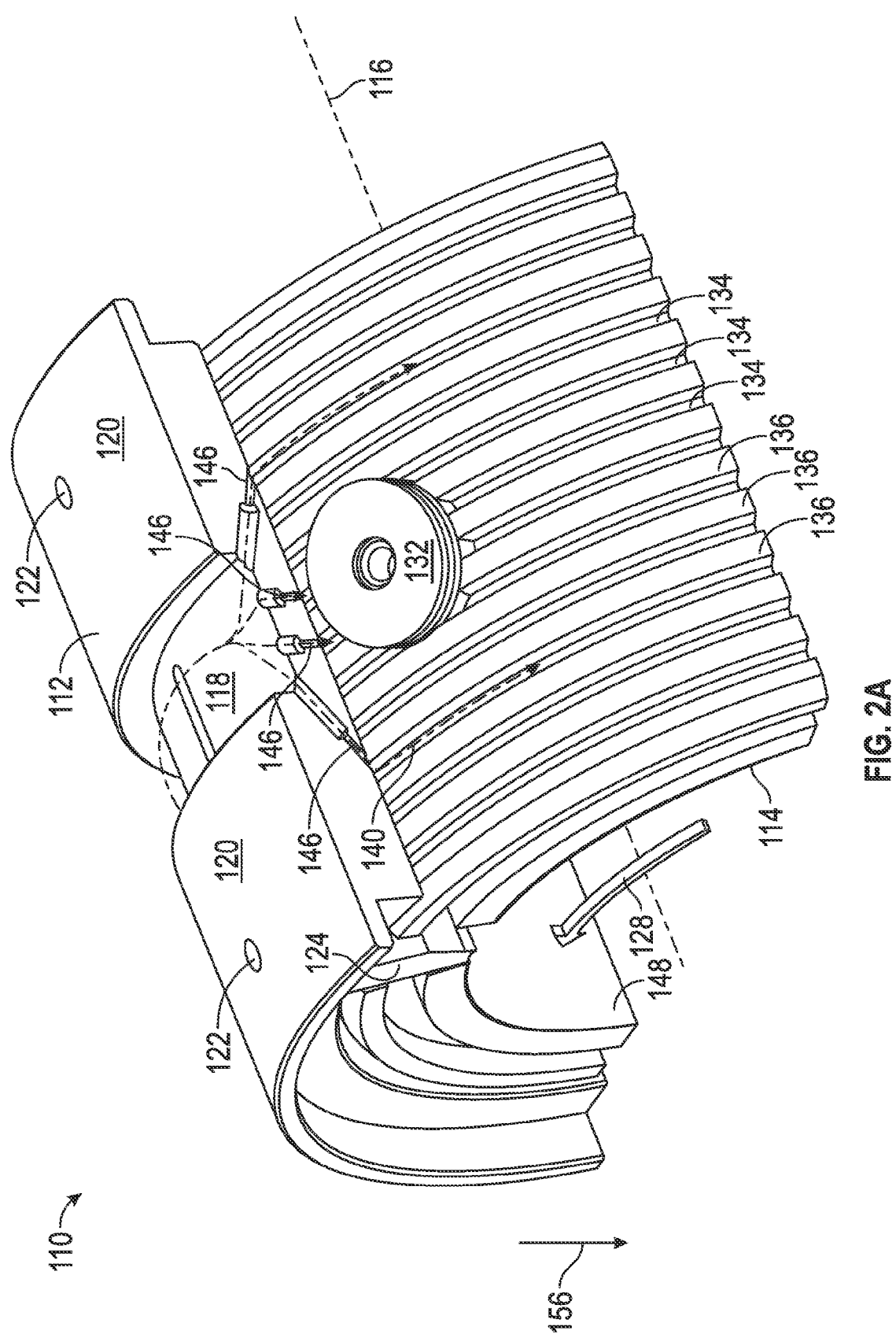
FIG. 2A illustrates a perspective view of another of many possible embodiments of bypass cooling system provided in a journal bearing assembly.
Figure 2B:
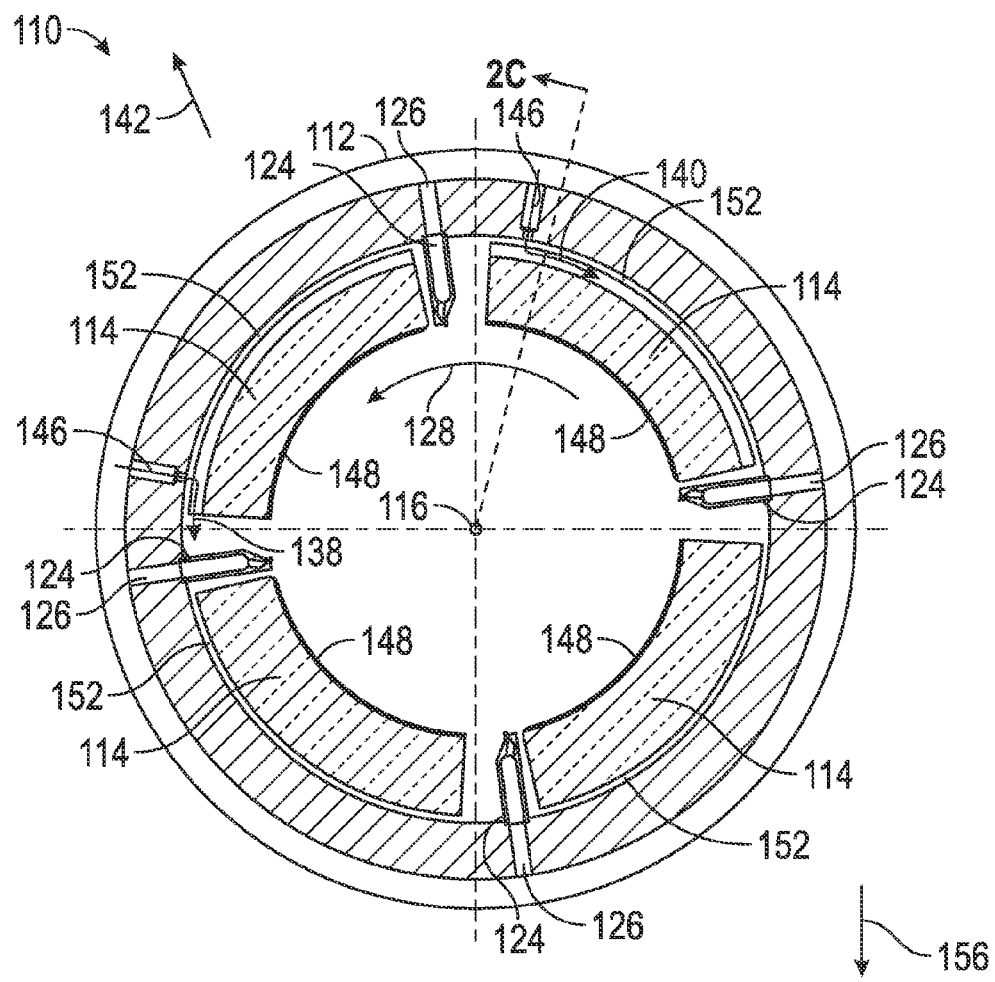
FIG. 2B illustrates a sectional view of the embodiment illustrated in FIG. 2A.
Figure 2C:
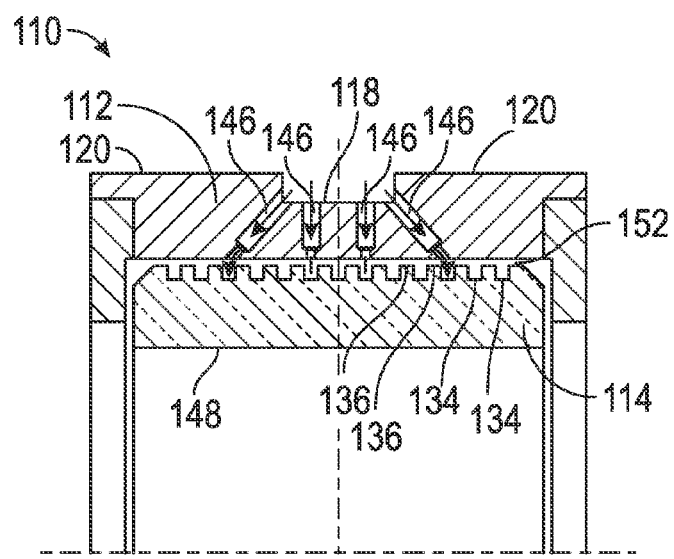
FIG. 2C illustrates a sectional view of the embodiment illustrated in FIG. 2A.

As is shown in FIGS. 2A, 2B, 2C, 3A, 3B, and 3C it is conceivable to manufacture oil conduits 146 so that they extend at other angles or are located at, on or in tilting pad journal bearing 110. For example, as is shown in FIGS. 2A, 2B, and 2C, one or more of the oil conduits 146 may be angled and may originate in the shell 112 of the tilting pad journal bearing 110. In this particular embodiment, the upper left tilting pad 114 receives standard bypass oil downhill 138 with rotation while the upper right pad 114 receives reverse bypass oil downhill 140 against rotation.

In another exemplary embodiment, a slot may be milled in the shell 112 of the tilting pad journal bearing 110 allowing oil conduits 146 to be situated perpendicular to the outside diameter surface of shell 112. In this particular embodiment, the upper left tilting pad 114 receives standard bypass oil downhill 138 with rotation while the upper right pad 114 receives reverse bypass oil downhill 140 against rotation. Angled holes need not be used in this configuration.

Figure 3A:
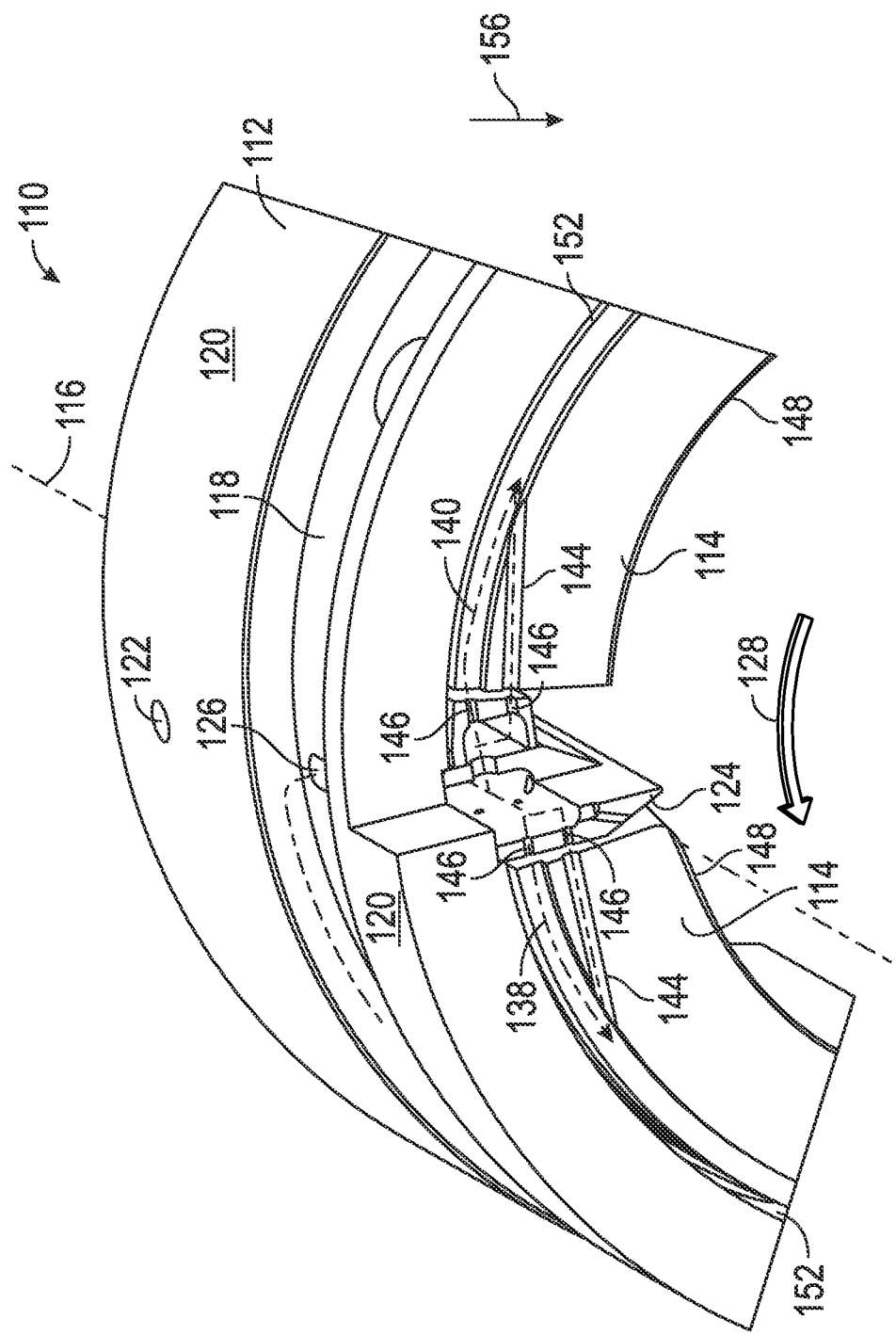
FIG. 3A illustrates a perspective view of another of many possible embodiments of a bypass cooling system provided in journal bearing assembly.
Figure 3B:
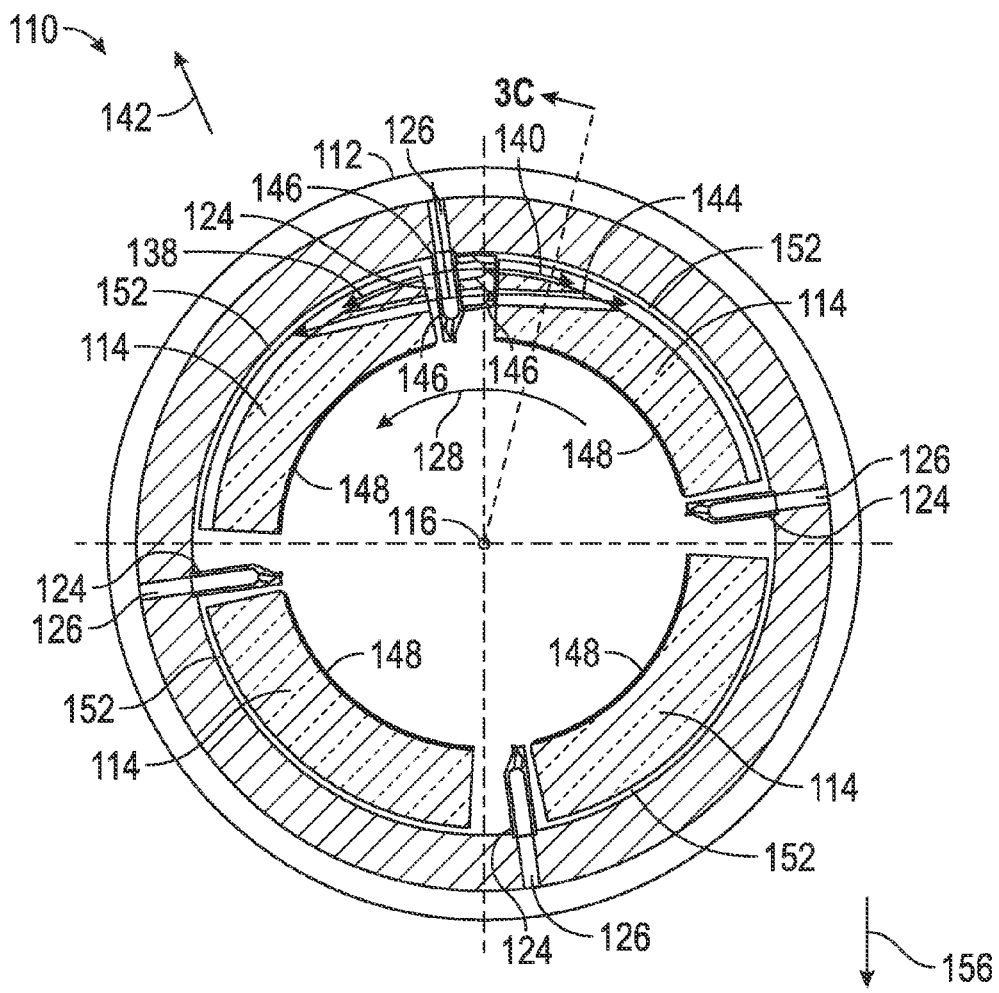
FIG. 3B illustrates a sectional view of the embodiment illustrated in FIG. 3A.
Figure 3C:
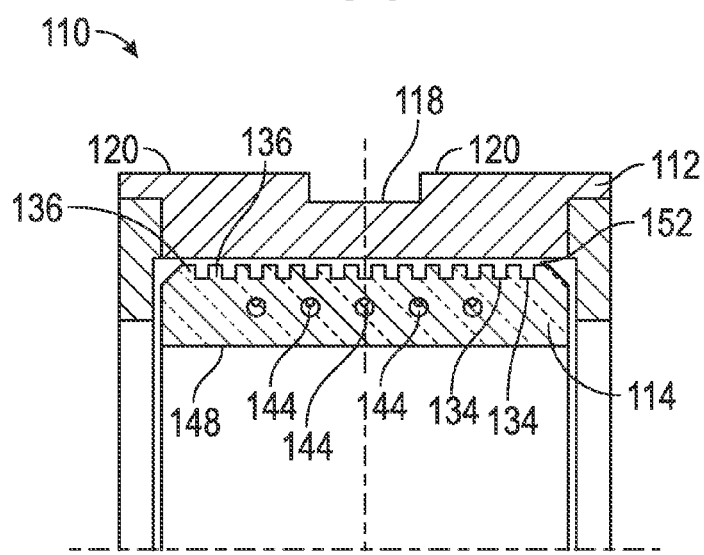
FIG. 3C illustrates a sectional view of the embodiment illustrated in FIG. 3A.

In yet another exemplary embodiment, as is shown in FIGS. 3A, 3B, and 3C, instead of heat transfer chambers 134 on the back of the loaded upper tilting pads 114, cooling holes 144 may be drilled through the loaded upper tilting pads 114. The standard bypass oil downhill 138 and reverse bypass oil downhill 140 may pass through these cooling holes 144, taking the heat away from the tilting pads 114. The standard bypass oil downhill 138 and reverse bypass oil downhill 140 may pass through the cooling holes 144 only or through both the cooling holes 144 and the heat transfer chambers 134.

In addition, a drain system conveys lubricating oil flowing along the inner bearing surface 148 and directed axially toward the opposite sides of the tilting pad 114 toward a drain recess which is formed in the side plate (not shown) of the bearing. The recess is open outwardly to guide the lubricating oil outside. As can be appreciated, the drain system prevents the inlet cooling oil from mixing up with the lubrication oil.

Figure 4:
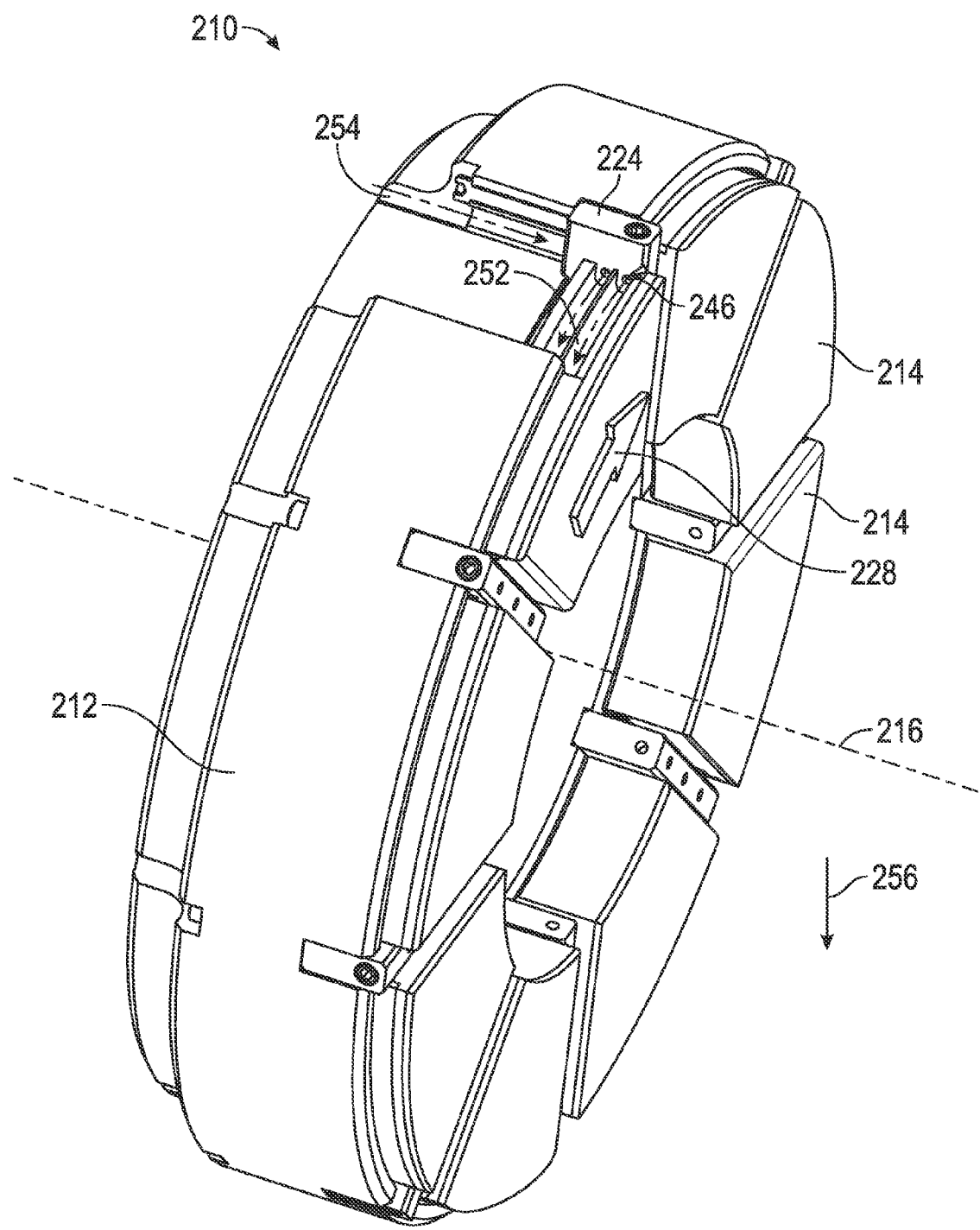
FIG. 4 illustrates a perspective view of one of many possible embodiments of bypass cooling system provided in a tilting pad thrust bearing.

Structures analogous to the one disclosed above for the tilting pad journal can be easily implemented in a thrust bearing assembly. Referring to FIG. 4, a bypass cooling system as shown in conjunction with a thrust bearing assembly 210 having a plurality of pads 214, which surround an axis 216. Similarly to the above-discussed bearing assemblies, the bypass cooling assembly includes axial passage 252 spaced from the outer surface of the pads 214 to convey cool inlet oil which does not interfere with a lubricating process of the thrust bearing assembly 210. This upper blocker bar 224, which also may function as a spray bar, arrangement is designed to always direct the cool inlet oil downhill, with gravity 256, instead of always in the direction of shaft rotation 228. It should be appreciated that directing the cool inlet oil downhill or with gravity 256 instead of always in the direction of shaft rotation 228 may include initially directing the cool inlet oil horizontally, uphill or against gravity before always directing the cool inlet oil downhill with gravity 256. The oil may be delivered from oil conduits 246. The oil conduits 246 may be located in the blocker bar 224, the casing 212, or otherwise positioned on or in the tilting pad journal bearing 210.

A shell or casing 212 has an axial channel 254 for cool inlet oil which is provided in the housing at a circumferential distance from the channel 254 delivering the cooling oil to the blocker bar 224. The channel 254 may guide the pressurized cooling oil directly to a recessed region of a top surface of the pad 214. Cooling oil traverses the heat transfer chambers and exits through a drain region (not shown) which opens in a cut out area in the shell or casing 212.

Alternatively, an inlet assembly for cooling oil includes a channel delivering cooling oil into an inner channel of the blocker bar 224 that distributes the cooling oil between circumferential heat transfer chambers provided on an outer side of the pads 214 spaced axially from its bearing surface. Alternatively, the chambers may be drilled in the pads 214 as channels spaced axially between the bearing and rear sides of the pad. A cut out region radially aligned with an opening, which is formed in the hosing, guides the bypass oil out of the pad. Alternatively, the bypass oil may be directed into multiple cooling holes drilled through the tilting thrust pad.

The examples disclosed herein are included to demonstrate preferred embodiments of the inventions. It should be appreciated by those of skill in the art that the techniques disclosed above represent techniques discovered by the inventors to function well in the practice of the inventions, and thus can be considered to constitute preferred modes for its practice. However, those of skill in the art should, in light of the present disclosure, appreciate that many changes can be made in the specific embodiments which are disclosed and still obtain a like or similar result without departing from the scope of the inventions.

Other and further embodiments utilizing one or more aspects of the inventions described above can be devised without departing from the spirit of Applicant's invention. Further, the various methods and embodiments of the methods of manufacture and assembly of the system, as well as location specifications, can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A bearing assembly for supporting a rotatable member, said bearing assembly comprising:
   a bearing casing having an inner surface;
   a plurality of pads mounted to the inner surface of the bearing casing, the pads having bearing surfaces that support the rotatable member, and said pads having outer surfaces spaced from the bearing surfaces;
   a blocker bar mounted to an upper half of the inner surface of the bearing casing, said blocker bar positioned intermediate of an upper first pad and an upper second pad of the plurality of the pads, said upper first pad being adjacent to said upper second pad; the blocker bar comprising,
   a reverse bypass oil conduit positioned to deliver liquid coolant under pressure against the direction of shaft rotation toward a trailing edge of the upper first pad, and
   a standard bypass oil conduit positioned to deliver liquid coolant under pressure in the direction of shaft rotation toward a leading edge of the upper second pad.

2. The bearing assembly of claim 1, wherein the bearing assembly comprises a tilting pad journal bearing or a tilting pad thrust bearing.

3. The bearing assembly of claim 1, further comprising circumferential heat transfer chambers positioned on the outer surfaces of the plurality of pads, wherein the liquid coolant delivered by the reverse bypass oil conduit traverses said heat transfer chambers against the direction of shaft rotation, and wherein the liquid coolant delivered by the standard bypass oil conduit traverses said heat transfer chambers in the direction of shaft rotation.

4. The bearing assembly of claim 3 wherein the circumferential heat transfer chambers are open grooves provided on the outer surface of the plurality of pads.

5. The bearing assembly of claim 4, wherein said axial cooling bore hole of said upper first pad extends from said leading or said trailing edge to said outer surface of said upper first pad, and wherein said axial cooling bore hole of said upper second pad extends from said leading or trailing edge to said outer surface of said upper second pad.

6. The bearing assembly of claim 1, further comprising an axial cooling bore hole drilled through the upper first pad and an axial cooling bore hole axially drilled through the upper second pad, wherein the liquid coolant delivered by the reverse bypass oil conduit traverses through said cooling bore hole in said upper first pad against the direction of the shaft rotation, and wherein the liquid coolant delivered by the standard bypass oil conduit traverses through said cooling bore hole in said upper second pad in the direction of the shaft rotation.

7. The bearing assembly of claim 6, wherein said axial cooling bore hole of said upper first pad extends from said leading or said trailing edge to said outer surface of said upper first pad, and wherein said axial cooling bore hole of said upper second pad extends from said leading or trailing edge to said outer surface of said upper second pad.

8. The bearing assembly of claim 1, wherein the plurality of pads are tiltably mounted on the inner surface of the bearing casing to accommodate horizontal and vertical shift of the rotatable member.

9. The bearing assembly of claim 1, wherein said upper first pad is an upper left pad and said upper second pad is an upper right pad.

10. The bearing assembly of claim 1, wherein said upper first pad is an upper right pad and said upper second pad is an upper left pad.

11. The bearing assembly of claim 1, wherein said blocker bar is a spray bar.

12. A tilting pad journal bearing or a tilting pad thrust bearing assembly for supporting a rotatable member, said bearing assembly comprising:
  a bearing casing having an inner surface;
  a plurality of pads mounted to the inner surface of the bearing casing, the pads having bearing surfaces that support the rotatable member, said pads comprising an upper first pad and an upper second pad, said plurality of pads having outer surfaces spaced from the bearing surfaces, said upper first pad being adjacent to said upper second pad, said upper first pad and said upper second pad each respectively having a leading edge and a trailing edge with respect to the rotatable member;
  a blocker bar extending radially and between said leading edge and said trailing edge of said adjacent first upper pad and said second upper pad, said blocker bar mounted to a top end of the inner surface of the bearing casing, said blocker bar positioned intermediate of said adjacent upper first pad and said upper second pad, the blocker bar having bidirectional cooling oil conduits, comprising:
    a plurality of reverse bypass oil conduits positioned to deliver liquid coolant under pressure against the direction of shaft rotation, at least one of said reverse bypass oil conduits configured to deliver said liquid coolant to heat transfer chambers on said outer surface of said upper first pad, at least another of said reverse bypass oil conduits configured to deliver said liquid coolant to an axial cooling bore hole drilled through the upper first pad, and
    a plurality of standard bypass oil conduits positioned to deliver liquid coolant under pressure in the direction of shaft rotation, at least one of said standard bypass oil conduits configured to deliver said liquid coolant to heat transfer chambers on said outer surface of said upper second pad, at least another of said standard bypass oil conduits configured to deliver said liquid coolant to an axial cooling bore hole drilled through the upper second pad.

13. The bearing assembly of claim 12, wherein the plurality of pads are tiltably mounted on the inner surface of the bearing casing to accommodate horizontal and vertical shift of the rotatable member.

14. The bearing assembly of claim 12, wherein said upper first pad is an upper left pad and said upper second pad is an upper right pad.

15. The bearing assembly of claim 12, wherein said upper first pad is an upper right pad and said upper second pad is an upper left pad.

16. The bearing assembly of claim 12, wherein said blocker bar is a spray bar.

17. The bearing assembly of claim 12, wherein the plurality of pads are tiltably mounted on the inner surface of the bearing casing to accommodate horizontal and vertical shift of the rotatable member.

* * * * *